US011545278B2

(12) United States Patent
Prestayko et al.

(10) Patent No.: US 11,545,278 B2
(45) Date of Patent: Jan. 3, 2023

(54) THREE PHASE IMMISCIBLE POLYMER-METAL BLENDS FOR HIGH CONDUCTIVITY COMPOSITES

(71) Applicant: XEROX CORPORATION, Norwalk, CT (US)

(72) Inventors: Rachel Prestayko, Hamilton (CA); Sarah J. Vella, Milton (CA); Carolyn Moorlag, Mississauga (CA); Barkev Keoshkerian, Thornhill (CA); Jordan H. Wosnick, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 199 days.

(21) Appl. No.: 16/254,513

(22) Filed: Jan. 22, 2019

(65) Prior Publication Data

US 2019/0156967 A1    May 23, 2019

Related U.S. Application Data

(62) Division of application No. 14/948,070, filed on Nov. 20, 2015, now Pat. No. 10,229,769.

(51) Int. Cl.
| | |
|---|---|
| *H01B 1/22* | (2006.01) |
| *B29B 7/00* | (2006.01) |
| *B29B 7/72* | (2006.01) |
| *B29B 7/88* | (2006.01) |
| *B29C 64/118* | (2017.01) |
| *B33Y 70/10* | (2020.01) |
| *B33Y 10/00* | (2015.01) |
| *B29C 64/165* | (2017.01) |
| *B29C 48/05* | (2019.01) |
| *B29K 103/06* | (2006.01) |
| *B29B 7/46* | (2006.01) |
| *B29C 48/02* | (2019.01) |
| *B29C 48/00* | (2019.01) |
| *B29K 25/00* | (2006.01) |
| *B29K 105/16* | (2006.01) |
| *B29K 505/14* | (2006.01) |

(52) U.S. Cl.
CPC ............... *H01B 1/22* (2013.01); *B29B 7/002* (2013.01); *B29B 7/005* (2013.01); *B29B 7/726* (2013.01); *B29B 7/88* (2013.01); *B29C 64/118* (2017.08); *B29C 64/165* (2017.08); *B33Y 10/00* (2014.12); *B33Y 70/10* (2020.01); *B29B 7/46* (2013.01); *B29C 48/02* (2019.02); *B29C 48/022* (2019.02); *B29C 48/05* (2019.02); *B29K 2025/08* (2013.01); *B29K 2103/06* (2013.01); *B29K 2105/16* (2013.01); *B29K 2505/14* (2013.01); *B29K 2995/0005* (2013.01)

(58) Field of Classification Search
None
See application file for complete search history.

(56) References Cited

U.S. PATENT DOCUMENTS

| | | |
|---|---|---|
| 6,284,832 B1 | 9/2001 | Foulger et al. |
| 6,331,586 B1 | 12/2001 | Thielen et al. |
| 2002/0192101 A1 | 12/2002 | Vaidyanathan et al. |
| 2006/0084742 A1 | 4/2006 | Ishida et al. |
| 2012/0177930 A1 | 7/2012 | Henckens |

FOREIGN PATENT DOCUMENTS

| | | |
|---|---|---|
| CN | 103289315 | 9/2013 |
| WO | 2015019212 A1 | 2/2015 |

OTHER PUBLICATIONS

Feng et al., "A method to control the dispersion of carbon black in an immiscible polymer blend," Society of Plastics Engineers, 2003, 1 page.
Indium Corporation, Product Data Sheet "Bismuth Solder," 2014, 2 pages.
Djellali et al., "Viscosity and Viscoelasticity Measurements of Low Density Polyethylene/Poly(lactic acid) Blends," Polymer Bulletin, Feb. 2015, 6 pages.
Madhu et al., "Blends of High Density Polyethylene and poly(L-lactic acid): Mechanical and Thermal Properties," Polymer Engineering and Science. 2013, 2 pages.
Yim et al., "Self-Interconnection Characteristics of Hybrid Composite with Low-Melting-Point Alloy Fillers," Journal of Composite Materials, 2012, 47 (9) 1141-1152.
Mrozek et al., "Highly Conductive, Melt Processable Polymer Composites Based on Nickel and Low Melting Eutectic Metal," Polymer, 51, 2010, 2954-2958.
Vesely et al., "Microscopy and Formation of Polymer/Metal Composites," Journal of Microscopy, vol. 177, Mar. 1995, 188-197.

*Primary Examiner* — Tanisha Diggs
(74) *Attorney, Agent, or Firm* — MH2 Technology Law Group LLP

(57) ABSTRACT

Provided is a method of forming a conductive polymer composite. The method includes forming a mixture. The mixture includes a first thermoplastic polymer, a second thermoplastic polymer and a plurality of metal particles. The first thermoplastic polymer and the second thermoplastic polymer are immiscible with each other. The plurality of metal particles include at least one metal that is immiscible with both the first thermoplastic polymer and the second thermoplastic polymer. The method includes heating the mixture to a temperature greater than or equal to a melting point of the metal.

19 Claims, 4 Drawing Sheets

THREE PHASE IMMISCIBLE POLYMER-METAL BLENDS FOR HIGH CONDUCTIVITY COMPOSITES

CROSS REFERENCE TO RELATED APPLICATIONS

This application is a divisional of U.S. application Ser. No. 14/948,070 filed Nov. 20, 2015, now U.S. Pat. No. 10,229,769, which issued on Mar. 12, 2019, the entire disclosure of which is hereby incorporated herein by reference in its entirety.

DETAILED DESCRIPTION

Field of the Disclosure

The present disclosure is directed to three-phase immiscible polymer-metal blends for high conductivity composites.

Background

Additive manufacturing (also known as three dimensional printing) as practiced in industry has been, to date, mostly concerned with printing structural features. There is a need for materials and processes that integrate functional properties (such as electronic features) into additive manufacturing. Recently, conductive materials that are potentially useful in additive manufacturing have been commercialized, but their conductivities are generally low, ranging from $\sim 10^{-3}$ S/cm to upwards of $\sim 2.0$ S/cm. The mechanical properties of the commercially available materials, particularly the conductive materials such as Acrylonitrile butadiene styrene (ABS) or polylactic acid (PLA), are generally limited (e.g., are not flexible, are fairly brittle) and have limited use as a conductive component.

There is great interest in the field of additive manufacturing to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics.

Common techniques in additive manufacturing utilize the extrusion of molten polymer through a heated nozzle. This method is used in, for example, fused deposition modeling (FDM), where a filament is fed into a hot zone for continuous extrusion. The molten polymer can be deposited layer by layer onto a build plate in order to form 3D objects. There are very few filament materials currently on the market which exhibit electrical conductivity, and those which are available have relatively low conductivities, which limits the range of potential applications. The materials are typically constructed such that one conductive material forms a percolating network through an insulating polymer base, such that electrons have a continuous pathway to flow. The formation of this conductive network is limited to the way the conductive particles are arranged within the polymer base. Although these materials have been extensively explored in both academia and industry, the focus is typically on minimizing the amount of conductive additive required to form a percolating network, where the conductivity is relatively low. One example of a paper directed to the study of dispersion of carbon black in an immiscible polymer blend is Feng, J. et al., A Method to Control the Dispersion of Carbon Black in an Immiscible Polymer Blend, Polymer Engineering & Science 2003, 43(5), 1058-1063, which describes that the dispersion of carbon black in an immiscible polymer blend is strongly influenced by the viscosity of one of the polymers of the polymer blend. This paper does not describe techniques for increasing conductivity substantially beyond the percolation threshold. Nor does it discuss the use of conductive polymers for additive manufacturing. One example of a patent directed to a conductive polymer is U.S. Pat. No. 6,331,586 by Thielen, A. et al. and published on Dec. 18, 2001, which describes a conductive polymer blend which is comprised of two immiscible polymers and a conductive material in particulate or fiber form. The patent does not describe techniques for increasing conductivity substantially beyond the percolation threshold.

Novel plastic composite materials that exhibit increased conductivity would be a welcome step forward in the art, and could have significant impacts in the field of additive manufacturing.

SUMMARY

An embodiment of the present disclosure is directed to a method of forming a conductive polymer composite, comprising: forming a mixture comprising a first thermoplastic polymer, a second thermoplastic polymer and a plurality of metal particles, wherein the first thermoplastic polymer and the second thermoplastic polymer are immiscible with each other, and wherein the plurality of metal particles comprise at least one metal that is immiscible with both the first thermoplastic polymer and the second thermoplastic polymer; and heating the mixture to a temperature greater than or equal to a melting point of the metal.

In another embodiment, there is a conductive polymer composite, comprising: a first thermoplastic polymer; a second thermoplastic polymer; and plurality of metal particles, wherein the first thermoplastic polymer and the second thermoplastic polymer are immiscible with each other, and wherein the plurality of metal particles comprise at least one metal that is immiscible with both the first thermoplastic polymer and the second thermoplastic polymer.

In another embodiment, there is a polymer composite filament, comprising: a first thermoplastic polymer defining a first continuous domain; a second thermoplastic polymer defining a second continuous domain, wherein the second thermoplastic is immiscible with the first thermoplastic; and a continuous metal trace disposed at an interface of the first continuous phase and the second continuous phase.

The compositions of the present application exhibit one or more of the following advantages: improved conductivity of filaments for 3D printing applications, such as fused deposition modeling (FDM); an unexpected, a phase separation of an alloy at its melting point which can be utilized in a two-phase immiscible polymer system to form a continuous conductive trace; or an improved method for increasing the electrical conductivity in composites while retaining material properties suitable for additive manufacturing.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
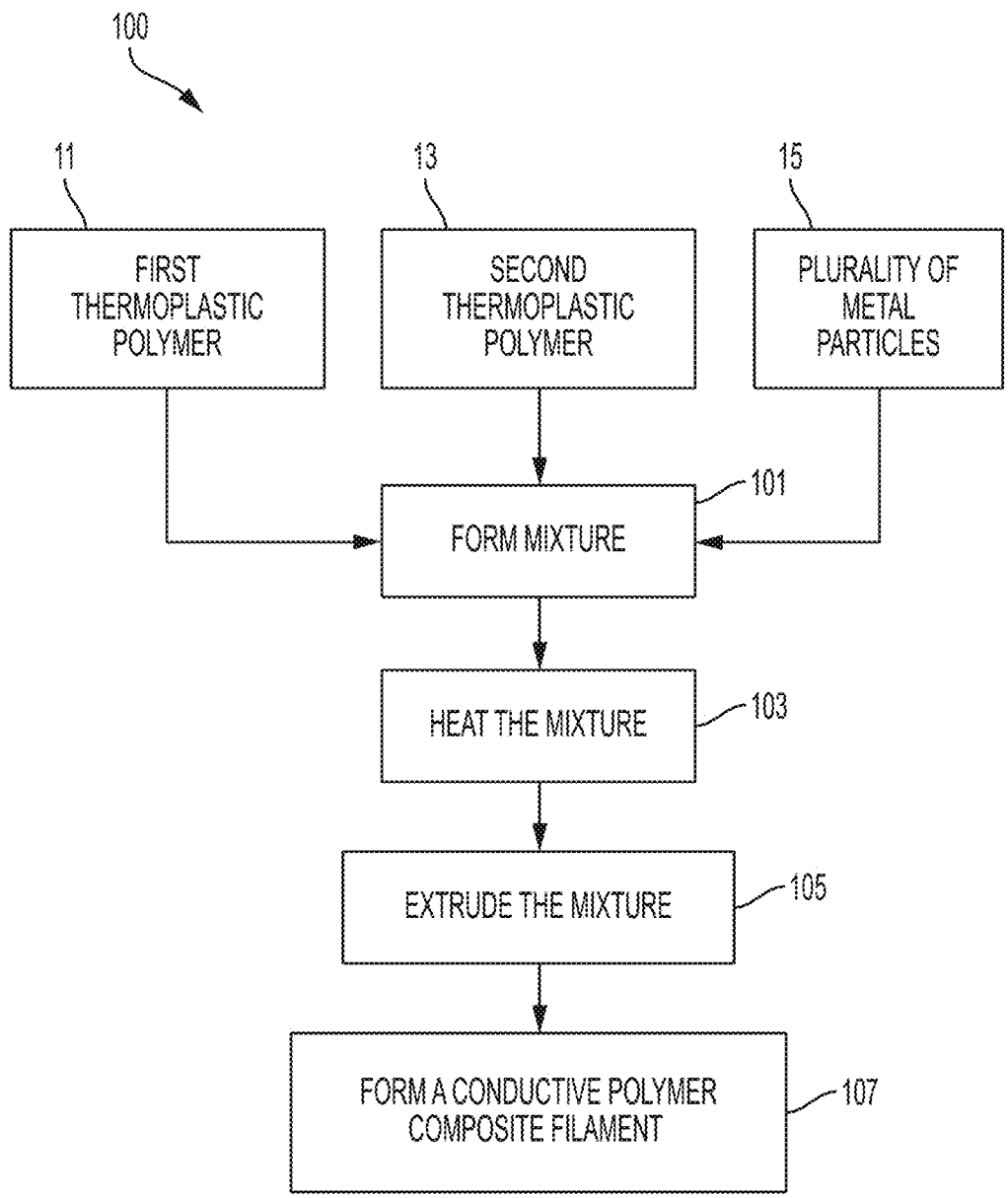
FIG. 1 is a flowchart showing the steps of a method of an embodiment.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to a conductive polymer composite. Generally, the conductive composite material comprises three immiscible phases which provide for the formation of a continuous conductive domain to be formed from one of the immiscible phases. That is, the composite comprises a three-phase composite material which contains a continuous metal trace, allowing for higher conductivity applications in additive manufacturing. The three-phase composite material comprises at least three components: first thermoplastic polymer, a second thermoplastic polymer, and a metal. These components are immiscible in order to form the three co-continuous domains. These domains can be formed at any point during processing: melt mixing, extrusion into filament, or extrusion during 3D printing.

The composites of the embodiments and methods of making such composites as described herein offer significant improvement over current composite materials. For example, as a result of the first thermoplastic polymer and the second thermoplastic polymer being immiscible with one another, melt-mixing the first thermoplastic polymer, the second thermoplastic polymer and the metal at a temperature below the melting point of the metal causes the metal to localize at an interface of the two co-continuous phases of the immiscible first and second thermoplastic polymers. After localization, the melt-mix can be heated above the melting point of the metal in order to form a larger, continuous domain. Alternatively, all three of the first thermoplastic polymer, the second thermoplastic polymer and the metal can be processed above the melting point of the metal to form three immiscible phases, each of which forms a co-continuous domain with the other. As a result of either of these processes, the conductivity of filaments formed by extrusion of such melt-mixtures does not depends on the metal/conductor forming a percolation network between particles thereof. Instead, for the embodiments described herein, the conductivity of the conductive composite filaments, for example, as measured between two ends thereof, comprises the conductivity of the metal itself, which is orders of magnitude higher than what's typically achieved in a percolating network. Accordingly, the embodiments described herein provide for conductive polymer composites to comprise any metals having low-melting temperature, including alloys and nanoparticles.

As shown in FIG. 1, in an embodiment a method 100 for forming a conductive polymer composite comprises forming a mixture at 101. The mixture can include a first thermoplastic polymer 11, a second thermoplastic polymer 13 and a plurality of metal particles 15. The first thermoplastic polymer and the second thermoplastic polymer may be selected such that they are immiscible with each other. The plurality of metal particles may comprise at least one metal that is immiscible with both the first thermoplastic polymer and the second thermoplastic polymer. The method continues with heating the mixture at 103, for example, to a temperature greater than or equal to a melting point of the metal. In an embodiment, upon heating the mixture, the plurality of metal particles undergo a phase separation comprising coalescing of at least two of the plurality of metal particles. While not limited to any particular theory it is believed that the plurality of metal particles preferentially localize at an interface between the first thermoplastic polymer and the second thermoplastic polymer. Such an interface may be the result of an interfacial tension between two co-continuous polymer phases forming a boundary where the particles preferentially localize as a result of a predetermined ratio of viscosities between the first and second thermoplastic polymers.

The mixture of the first thermoplastic polymer, the second thermoplastic polymer and the plurality of metal particles can be formed by melting the first thermoplastic polymer and the second thermoplastic polymer such that they form two co-continuous immiscible phases separated by an interface. Accordingly, melting can include melting the first thermoplastic polymer and the second thermoplastic polymer at a temperature below the melting point of the at least one metal. As a result, the mixture can, therefore, include a first domain that includes first thermoplastic polymer, a second domain that includes the second thermoplastic polymer, and a third domain that includes the metal. In an embodiment, mixing may include melt-mixing the first thermoplastic polymer and the second thermoplastic polymer. In an embodiment, the method 100 can include extruding the mixture at 105 and forming a conductive polymer composite filament at 107.

The method can further include forming a composite by cooling the heated mixture, wherein the composite comprises a continuous metal trace. The method can further include providing the composite to a three-dimensional-printer, heating the composite, and extruding the heated composite onto a substrate to form a three-dimensional object. In an embodiment, the mixing step can include providing the first thermoplastic polymer, the second thermoplastic polymer and the metal to a three-dimensional printer followed by melting the first thermoplastic polymer and the second thermoplastic polymer and extruding the heated mixture onto a substrate to form a three-dimensional object.

Thermoplastic Polymers

Any suitable thermoplastic polymer useful in three-dimensional printing can be employed as the first and the second thermoplastic polymers in the composites of the present disclosure. In an example, the first and second thermoplastic polymers are immiscible with each other.

Accordingly, the first thermoplastic polymer may be different than the second thermoplastic polymer. While not limited to any particular theory, it is believed that hydrophobic/hydrophilic characteristic of a thermoplastic polymer is a physical property that provides for the immiscibility between different thermoplastic polymers. Accordingly, in an embodiment, the first thermoplastic polymer is more hydrophobic than the second thermoplastic polymer. Alternatively, in an embodiment, the second thermoplastic polymer is more hydrophobic than the first thermoplastic polymer. Meanwhile, in an embodiment, the first thermoplastic polymer is more hydrophilic than the second thermoplastic polymer. Alternatively, in an embodiment, the second thermoplastic is more hydrophilic than the first thermoplastic polymer. In another embodiment, the first thermoplastic polymer is hydrophobic and the second thermoplastic polymer is hydrophilic. Alternatively, in an embodiment, the second thermoplastic polymer is hydrophobic and the first thermoplastic polymer is hydrophilic.

The first and the second thermoplastic polymer may be selected from high density polyethylene (HDPE), metallocene catalyzed linear low density polyethylene (mLLDPE), polypropylene (PP) thermoplastic urethane (TPU), ethylene propylene rubber (EPR), ethylene propylene diene rubber (EPDM), Poly(styrene-isoprene-styrene), polycaprolactone, acrylonitrile butadiene styrene (ABS), polylactic acid (PLA), copolymers thereof such as block copolymers thereof, or any combinations thereof.

Exemplary combinations of first and second thermoplastic polymer (e.g., first theremoplastic polymer/second theremoplastic polymer) include: HDPE/EPR, HDPE/EPDM, HDPE/mLLDPE, PP/EPDM, PP/EPR, PP/mLLDPE, and mLLDPE/EPR.

The amounts of the first and second thermoplastic polymer may be selected such that the first and second thermoplastic polymers form co-continuous domains when mixed together. In an example, the polymeric content of a composite of the embodiments can be selected such that the first thermoplastic polymer comprises from about 10% to about 90% by weight relative to the total weight of the conductive polymer composite, and the second thermoplastic polymer comprises from about 10% to about 90% by weight relative to the total weight of the conductive polymer composite. In an example, the polymeric content of a composite of the embodiments can be selected such that the first thermoplastic polymer comprises from about 2.5% to about 67.5% by weight relative to the total weight of the conductive polymer composite, for example 5% to about 67.5% by weight relative to the total weight of the conductive polymer composite; and the second thermoplastic polymer comprises from about 2.5% to about 67.5% by weight relative to the total weight of the conductive polymer composite, for example, from about 5% to about 67.5% by weight relative to the total weight of the conductive polymer composite.

The composite can include three immiscible components. The components may include two polymers (i.e., the first thermoplastic polymer and the second thermoplastic polymer and one metal or metal alloy. In other words, the composite can comprise a first thermoplastic polymer, a second thermoplastic polymer and at least one metal.

Metal

For the metal, any suitable metal useful in three-dimensional printing can be employed in the composites of the present disclosure. The metal may be selected from any metal and may include metal alloys. Any suitable metal can be employed, for example, in particular form. Examples of suitable metals include Bi, Sn, Sb, Pb, Ag, In, Cu, or alloys thereof. For example, alloys may include at least one of the following, BiSnPb, BiSn, BiSnAg, SbPbBi, SnBi, InSn, SnInAg, SnAgCu, SnAg, SnCu, SnSb, SnAgSb, or mixtures thereof.

The metal may be selected based on its melting temperature, for example, in ambient environments. For example, metals comprising a melting temperature (Tm) in the range of from about 100° C. to about 250° C. may be selected. The metal may be immiscible with the first thermoplastic polymer and the second thermoplastic polymer.

Example amounts of metal include a range of from 10% to about 75% by weight, such as from about 25% to about 75% by weight, or from about 50% to about 75% by weight relative to the total weight of the conductive polymer composite.

The conductive polymer composites of the present disclosure can include any other suitable ingredients in any desired amounts, although not required. Alternatively, ingredients not expressly recited in the present disclosure can be limited and/or excluded from the conductive polymer composites disclosed herein. Thus, the amounts of the thermoplastic polymer, metal, first polymer and second polymer as recited herein, can add up to from about 90% to about 100% by weight of the total ingredients employed in the composites of the present disclosure, such as from about 95% to about 100% by weight, or from about 98% to about 100% by weight, or from about 99% to about 100% by weight, or about 100% by weight of the total ingredients.

Because of the continuous metal domains that form at an interface between immiscible thermoplastic polymers, the composite of the embodiments also has a bulk conductivity of the bulk metal of the selected metal. Bulk conductivity is calculated using the formula, $$\sigma = L/(R*A) \qquad (1)$$

Where:
σ is bulk electrical conductivity;
L is length of the filament;
R is measured resistance of an extruded filament;
A is the cross-sectional area ($\pi r^2$) of the filament, where r is
the radius of the filament.

The resistance, R, can be measured by forming an extruded filament made from the composite. The tips of the filament are painted with silver to provide good electrical connections with the testing equipment (e.g., a digital multimeter), but would not necessarily be painted if the filaments were to be used in additive manufacturing. Resistance can then be measured across the length of the filament. The dimensions of the filament and the measured value for R can then be used to calculate bulk conductivity (a) of the composite.

The composites of the present disclosure can be made by any suitable method. For example, the thermoplastic polymer can be combined with the first polymer, the second polymer and the metal particles using melt mixing techniques. Other suitable techniques for mixing such compositions are well known in the art.

The present disclosure is also directed to a method of three dimensional printing. The method includes providing any of the conductive polymer composites of the present disclosure to a three dimensional printer. The composite can be in any suitable form useful in three dimensional printing, such as a filament. The conductive polymer is generally heated to a molten state suitable for extrusion. Then the heated conductive polymer is extruded onto a substrate to form a three dimensional object.

EXAMPLES

Example 1

Figure 2:
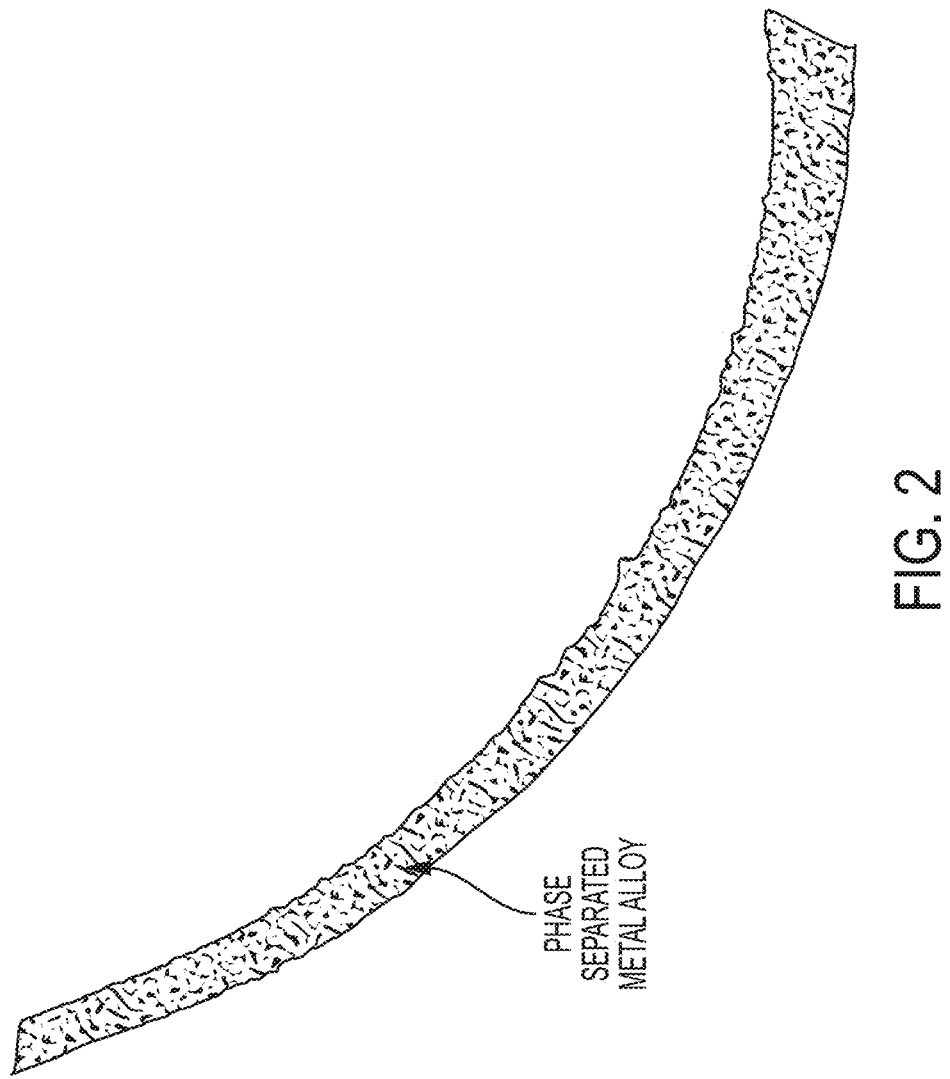
FIG. 2 is a photograph showing an example of BiSnAg alloy phase separation in poly(styrene-isoprene-styrene) block copolymer to the surface of a filament during extrusion.

Poly(styrene-isoprene-styrene) block copolymer was melt mixed with BiSnAg metal alloy (Indalloy #282, available from INDIUM CORPORATION®, United States) for 30 minutes at 30 rpm in a twin screw extruder. Filaments were extruded on a melt flow indexer to form filaments 1.75 mm in diameter with a custom designed die and 19.66 kg weight. During processing, the metal alloy phase separated to areas of lower surface tension. While melt mixing above the melting point of BiSnAg alloy on the twin screw extruder, the alloy phase separated to the edges of the chamber. When melt mixed below the melting point of the metal alloy and extruded above the melting temperature, filament extruded from the melt flow indexer was observed as having phase separated alloy on the surface of the filament as shown in FIG. 2.

Figure 3A:
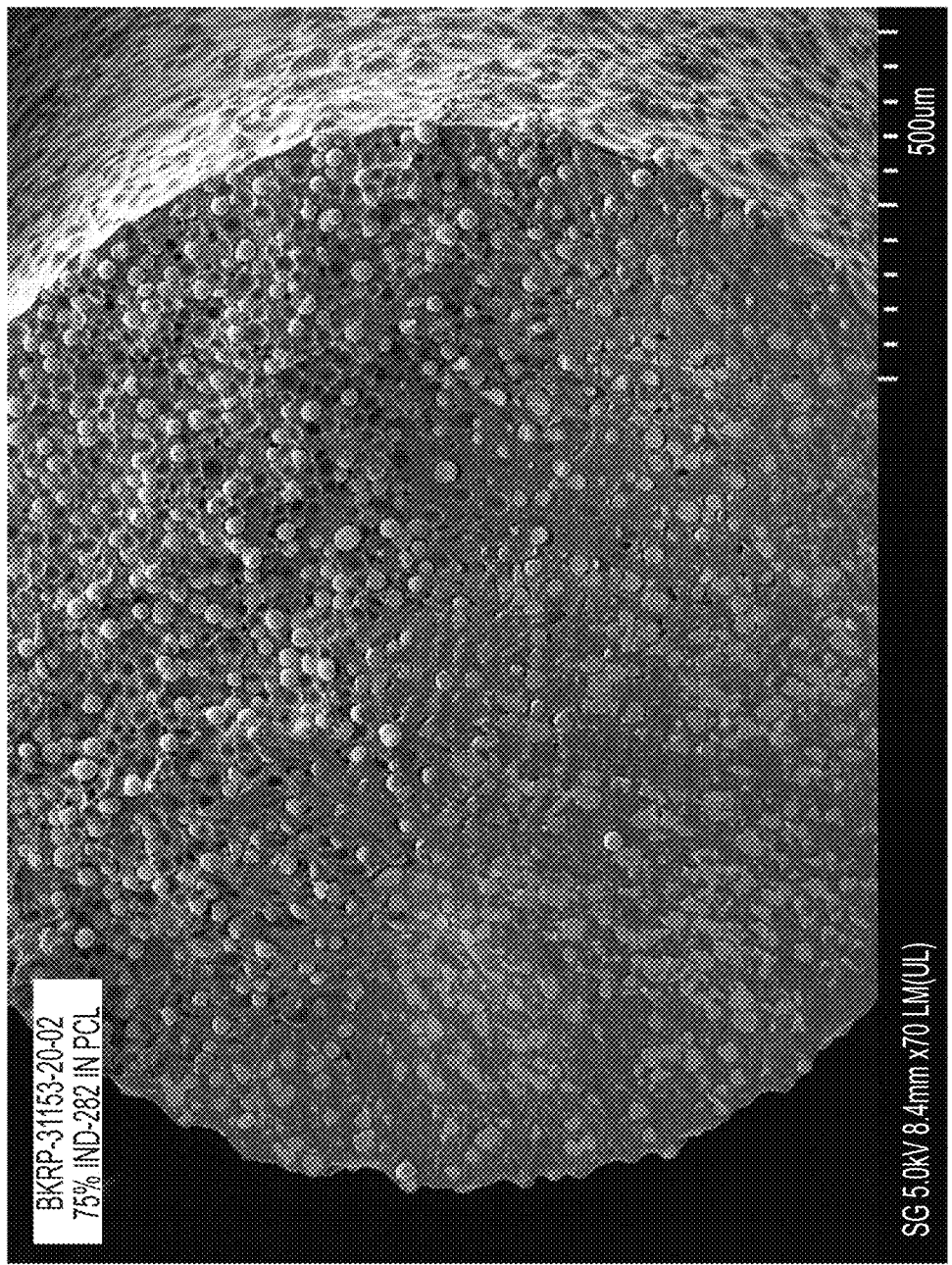
FIGS. 3A-3B are scanning electron micrographs of a filament comprising BiSnAg particles in polycaprolactone extruded below the melting point of BiSnAg (FIG. 3A), and above the melting point of BiSnAg and showing the phase separation and coalescence into larger domains (FIG. 3B).
Figure 3B:
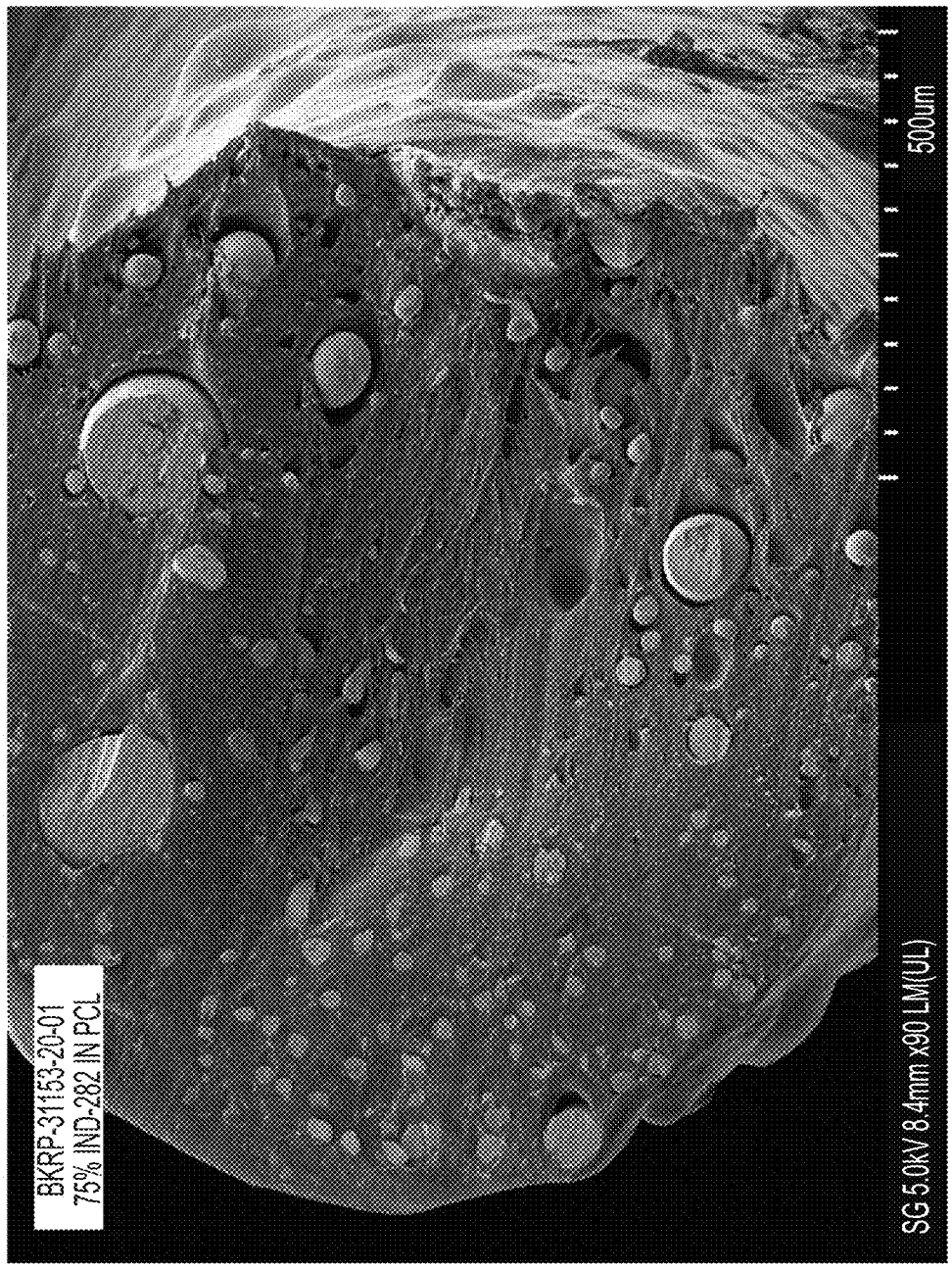

In addition to phase separation, the alloy particles were unexpectedly observed to have undergone a phase change as evidenced by larger domains shown between FIGS. 3A-3B. While not limited to any particular embodiment, it is believed that the alloy phase separated to areas of lower surface tension.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A conductive polymer composite, comprising:
a first thermoplastic polymer;
a second thermoplastic polymer; and
a plurality of metal particles,
wherein the first thermoplastic polymer and the second thermoplastic polymer are immiscible with each other,
wherein the plurality of metal particles comprises at least one metal that is immiscible with both the first thermoplastic polymer and the second thermoplastic polymer, and wherein a bulk conductivity of the conductive polymer composite is the same as a bulk conductivity of the metal in the plurality of metal particles,
wherein an amount of the plurality of metal particles ranges from about 25% to about 75% by weight relative to a total weight of the conductive polymer composite,
wherein the first thermoplastic polymer defines a first continuous domain,
wherein the second thermoplastic polymer defines a second continuous domain, and
wherein a continuous metal trace is disposed at an interface of the first continuous domain and the second continuous domain.

2. The conductive polymer composite of claim 1, wherein the first thermoplastic polymer, the second thermoplastic polymer, or both comprise a thermoplastic polymer selected from a high density polyethylene (HDPE), metallocene catalyzed linear low density polyethylene (mLLDPE), polypropylene (PP), thermoplastic urethane (TPU), ethylene propylene rubber (EPR), ethylene propylene diene rubber (EPDM), polycaprolactone, acrylonitrile butadiene styrene (ABS), polylactic acid (PLA), copolymers thereof, or mixtures thereof, and wherein the first thermoplastic polymer comprises a thermoplastic polymer different from that of the second thermoplastic polymer.

3. The conductive polymer composite of claim 1, wherein the metal particles comprise BiSnPb, BiSn, BiSnAg, SbPbBi, SnBi, InSn, SnInAg, SnAgCu, SnAg, SnCu, SnSb, SnAgSb, or mixtures thereof.

4. The conductive polymer composite of claim 1, wherein the plurality of metal particles comprise Bi, Sn, Sb, Pb, Ag, In, Cu, or alloys thereof.

5. The conductive polymer composite of claim 1, wherein the metal particles comprise BiSnAg and at least one of BiSnPb, BiSn, SbPbBi, SnBi, InSn, SnInAg, SnAgCu, SnAg, SnCu, SnSb, SnAgSb or mixtures thereof.

6. The conductive polymer composite of claim 1, wherein the composite is formed by a method comprising the steps of:
forming a mixture comprising the first thermoplastic polymer, the second thermoplastic polymer and the plurality of metal particles,
wherein the forming the mixture comprises melting the first thermoplastic polymer and the second thermoplastic polymer such that they form two co-continuous immiscible phases separated by an interface,
wherein the melting comprises melting the first thermoplastic polymer and the second thermoplastic polymer at a temperature below the melting point of the plurality of metal particles;
heating the mixture to a temperature greater than or equal to a melting point of the plurality of metal particles; and
forming the composite by cooling the heated mixture.

7. The conductive polymer composite of claim 1, wherein at least two of the plurality of metal particles are coalesced.

8. The conductive polymer composite of claim 1, wherein the first thermoplastic polymer comprises a poly(styrene-isoprene-styrene) block copolymer.

9. The conductive polymer composite of claim 1, wherein the conductivity of the composite does not depend on the plurality of metal particles forming a percolation network between the particles.

10. The conductive polymer composite of claim 1, wherein the first thermoplastic polymer comprises from about 2.5% to about 67.5% by weight relative to the total weight of the conductive polymer composite and
the second thermoplastic polymer comprises from about 2.5% to about 67.5% by weight relative to the total weight of the conductive polymer composite.

11. A polymer composite filament, comprising:
a first thermoplastic polymer defining a first continuous domain; and
a second thermoplastic polymer defining a second continuous domain,
wherein the second thermoplastic polymer is immiscible with the first thermoplastic polymer,
wherein a continuous metal trace is disposed at an interface of the first continuous domain and the second continuous domain, said continuous metal trace being formed from a plurality of metal particles and wherein a bulk conductivity of the polymer composite filament is the same as a bulk conductivity of the metal in the plurality of metal particles, and
wherein an amount of the plurality of metal particles ranges from about 25% to about 75% by weight relative to a total weight of the polymer composite filament.

12. The polymer composite filament of claim 11, wherein the first thermoplastic polymer comprises a poly(styrene-isoprene-styrene) block copolymer.

13. The polymer composite filament of claim 11, wherein the plurality of metal particles comprise a mixture of more than one of BiSnPb, BiSn, BiSnAg, SbPbBi, SnBi, InSn, SnInAg, SnAgCu, SnAg, SnCu, SnSb or SnAgSb.

14. The polymer composite filament of claim 11, wherein the plurality of metal particles comprises BiSnAg.

15. The polymer composite filament of claim 11, wherein the plurality of metal particles comprises BiSnAg and at least one of BiSnPb, BiSn, SbPbBi, SnBi, InSn, SnInAg, SnAgCu, SnAg, SnCu, SnSb, SnAgSb or mixtures thereof.

16. The polymer composite filament of claim 11, wherein the composite is formed by a method comprising the steps of:
forming a mixture comprising the first thermoplastic polymer, the second thermoplastic polymer and the plurality of metal particles,
wherein the forming of the mixture comprises melting the first thermoplastic polymer and the second thermoplastic polymer such that they form two co-continuous immiscible phases separated by an interface, and
wherein the melting comprises melting the first thermoplastic polymer and the second thermoplastic polymer at a temperature below the melting point of the plurality of metal particles;
heating the mixture to a temperature greater than or equal to a melting point of the plurality of metal particles, and
forming the composite by cooling the heated mixture.

17. The polymer composite filament of claim 11, wherein the first thermoplastic polymer comprises one or more polycaprolactone polylactic acid (PLA), copolymers thereof, or mixtures thereof.

18. The polymer composite filament of claim 11, wherein the plurality of metals comprises Bi, Sn, Sb, Pb, Ag, In, Cu, or alloys thereof.

19. A conductive polymer composite, comprising:
a first thermoplastic polymer;
a second thermoplastic polymer; and
a plurality of metal particles,
wherein the first thermoplastic polymer and the second thermoplastic polymer are immiscible with each other,
wherein the plurality of metal particles comprise at least one metal that is immiscible with both the first thermoplastic polymer and the second thermoplastic polymer, wherein
the first thermoplastic polymer defines a first continuous domain;
the second thermoplastic polymer defines a second continuous domain;
wherein
a continuous metal trace is disposed at an interface of the first continuous domain and the second continuous domain,
wherein the plurality of metal particles comprises BiSnAg and at least one of BiSnPb, BiSn, SbPbBi, SnBi, InSn, SnInAg, SnAgCu, SnAg, SnCu, SnSb, SnAgSb or mixtures thereof,
wherein a bulk conductivity of the conductive polymer composite is the same as a bulk conductivity of the metal in the plurality of metal particles, and
wherein an amount of the plurality of metal particles ranges from about 25% to about 75% by weight relative to a total weight of the conductive polymer composite.

* * * * *